United States Patent
Engelsberg et al.

(10) Patent No.: US 7,142,696 B1
(45) Date of Patent: Nov. 28, 2006

(54) ASSISTANCE DEVICE IN A MOTOR VEHICLE

(75) Inventors: Andreas Engelsberg, Hildesheim (DE); Sven Bauer, Hildesheim (DE); Bernd Schmale, Hildesheim (DE); Holger Kussmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 818 days.

(21) Appl. No.: 10/129,398

(22) PCT Filed: Oct. 17, 2000

(86) PCT No.: PCT/DE00/03643

§ 371 (c)(1),
(2), (4) Date: Oct. 25, 2002

(87) PCT Pub. No.: WO01/32472

PCT Pub. Date: May 10, 2001

(30) Foreign Application Priority Data

Nov. 3, 1999 (DE) .................. 199 52 854

(51) Int. Cl.
G06K 9/00 (2006.01)
G05B 19/00 (2006.01)
G05D 1/00 (2006.01)
G08G 1/123 (2006.01)

(52) U.S. Cl. .............................. 382/118; 340/5.6; 701/1

(58) Field of Classification Search ................ 382/118, 382/103, 104, 117, 181, 190; 414/462, 921, 414/501; 280/304.1; 340/477, 988, 425.5, 340/5.31, 438, 5.6; 342/357.06, 357.13; 701/117, 213, 214, 28, 300, 45, 1

See application file for complete search history.

(56) References Cited

U.S. PATENT DOCUMENTS

| | | | | | |
|---|---|---|---|---|---|
| 4,264,979 A | * | 4/1981 | Gutowski | .................. | 455/77 |
| 4,477,874 A | * | 10/1984 | Ikuta et al. | .................... | 701/49 |
| 5,852,804 A | * | 12/1998 | Sako | ........................ | 704/275 |
| 6,111,964 A | * | 8/2000 | Ishibashi | ..................... | 381/86 |
| 6,122,580 A | * | 9/2000 | Autermann | ................. | 701/49 |
| 6,198,996 B1 | * | 3/2001 | Berstis | ......................... | 701/36 |
| 6,225,890 B1 | * | 5/2001 | Murphy | ................. | 340/426.19 |
| 6,252,978 B1 | * | 6/2001 | Grantz | ........................ | 382/118 |
| 6,750,832 B1 | * | 6/2004 | Kleinschmidt | ................. | 345/7 |

FOREIGN PATENT DOCUMENTS

| | | |
|---|---|---|
| DE | 38 17 495 | 11/1989 |
| DE | 44 14 216 | 4/1995 |
| DE | 196 31 414 | 2/1998 |
| DE | 197 28 226 | 1/1999 |
| DE | 19728226 A1 * | 1/1999 |
| EP | 0 870 654 | 10/1998 |
| EP | 0 893 308 | 1/1999 |

* cited by examiner

*Primary Examiner*—Sheela Chawan
(74) *Attorney, Agent, or Firm*—Kenyon & Kenyon LLP

(57) ABSTRACT

An assistance device in a vehicle is described. The assistance device may be used to create a user profile for a driver and to call up the user profile to perform the settings on the various components. The assistance device may include a computer, which may be connected to means for person recognition. Connected data sources, means for representation, means for data reception, an air conditioning system, and a control system for person-specific variable components of the vehicle may be adjusted according to the user profile of the respective driver. The computer may as an alternative be connected to other components over a bus. The user profile may be altered according to a user's most recent settings.

11 Claims, 1 Drawing Sheet

ASSISTANCE DEVICE IN A MOTOR VEHICLE

FIELD OF THE INVENTION

The present invention relates to an assistance device in a vehicle.

BACKGROUND INFORMATION

German Published Patent No. 44 14 216 discusses an object recognition system that may be mounted on a vehicle to recognize on the basis of a person's face whether that person is authorized for that vehicle. For this purpose, data may be loaded from a memory to compare this data with the person's face in order to determine whether this person is recognized as authorized. This device may be used to determine whether a person is to be allowed to drive the vehicle.

German Published Patent Application No. 197 28 226 discusses how settings are made in a vehicle according to a user profile. The settings may involve an air conditioning system, the engine, transmission, seat and immobilizer. The person may be recognized by entries or biometric methods. European Published Patent Application No. 89,308 discusses a device which may provide an avatar for communication in a vehicle. The avatar may evaluate a driver's entries and actions and create patterns from them. A user profile may be derived from these patterns. Then the actions of the avatar may be set. A biometric recognition of the driver may be described, so that then the avatar delivers the acknowledgment that the driver has been recognized. German Published Patent Application No. 381 74 95 discusses a vehicle having electronically controllable functions adjustable in a user-specific manner, the user's settings may be recognized and stored as his typical behavior, and this user-specific data may be used for the settings as soon as the corresponding memory is connected to a processor. The user-specific settings may pertain in particular to the program selection or broadcast station settings and control of a radio receiver. European Published Patent Application No. 870,654 discusses a device and a method for driver-specific setting of vehicle devices. The setting parameters of the vehicle devices may be stored in a local processor as a setting parameter data set and may be delivered as action signals to the device objects via a control and/or regulation device. Optionally, sensor signals may be fed back into the control and/or regulation device. German Published Patent Application No. 196 31 414 discusses a device for recording the retinal reflex pattern and additional images superimposed in the eye.

SUMMARY OF THE INVENTION

The assistance device according to the present invention in a vehicle may have the advantage over the related art that a user profile may be loaded for a person recognized by an object recognition system. This user profile may determine settings within the vehicle. This may permit increased comfort and increased security while greatly simplifying the handling of the vehicle.

It may be advantageous that information from various data sources may be channeled via presettings which may be stored in the user profile, so that the driver may advantageously receive only the information he/she desires.

It may be advantageous that unambiguous identification of a person may be made possible through video and speech recognition of the respective person.

In addition, it may be advantageous that it may be possible to receive and/or call up data from outside the vehicle by way of existing receiving stations or sending/receiving stations. Therefore, up-to-date information may be supplied to the driver to keep him informed regarding the information requested.

It may also be advantageous that the data sources include a memory which contains the user profiles, a data server in which information such as operating instructions or a user's guide may be stored, and a navigation device with which it may be readily possible to determine the location and the travel destination. The information in these data sources may increase driving comfort and simplify handling of the vehicle.

In addition, it may be advantageous that a convenient rendering of the information to be displayed is made possible through acoustic and/or visual display options.

Displaying the information on a windshield of the vehicle may permit a convenient and safe display within the driver's field of vision. This may advantageously and significantly increase driving safety because the driver may need not look away from the road.

It may also be advantageous that by using a display screen as a visual display, the information may be displayed in a clearly discernible manner and with a high resolution. A three-dimensional display may also be possible.

In addition, it may also be advantageous that the use of a projection surface within the vehicle may be avoided by using a retinal projector. This may simplify the design of the device. In addition, a three-dimensional representation may be possible with a retinal projection to reproduce the most realistic possible image.

It may be also advantageous that convenient forms of representation which increase security are possible through a combination of the display options mentioned above, depending on the application.

It may also be advantageous that a great simplification in the wiring of the components is achieved by connecting the components of the assistance device and the components connected to the assistance device by a bus, and thus an inexpensive implementation may be achieved.

In addition, it may be advantageous that the assistance device according to the present invention updates the user profiles through settings by the driver and thus learns the preferences of the respective driver. This may eliminate the need for the respective driver to enter all his preferred settings, because the user profile may be expanded by manual settings by the driver. This may greatly simplify the creation of a user profile because it may not be necessary to make all possible entries at the beginning to construct a user profile. This may greatly simplify operation.

DETAILED DESCRIPTION

A passenger vehicle today has many elements and components which may be set specifically, depending on the respective person as the driver. These may include the seat, the headrest, the air conditioning system and in particular the various data sources which may be combined under the heading of infotainment. This may also include the car radio as a receiving station as well as navigation systems, storage media in the vehicle and sending/receiving stations such as mobile telephones.

If a vehicle is used by several people, who may also have different preferences with regard to the settings mentioned above, the respective person may need to change all the settings for himself. This goes to such an extent that changing the settings, such as those on the car radio or on the navigation system, may interfere with driving safety during a trip when this person is using the vehicle.

Therefore, according to the present invention, a user profile may be created for a person who appears as a driver to automatically perform the respective personal settings.

Figure 1:
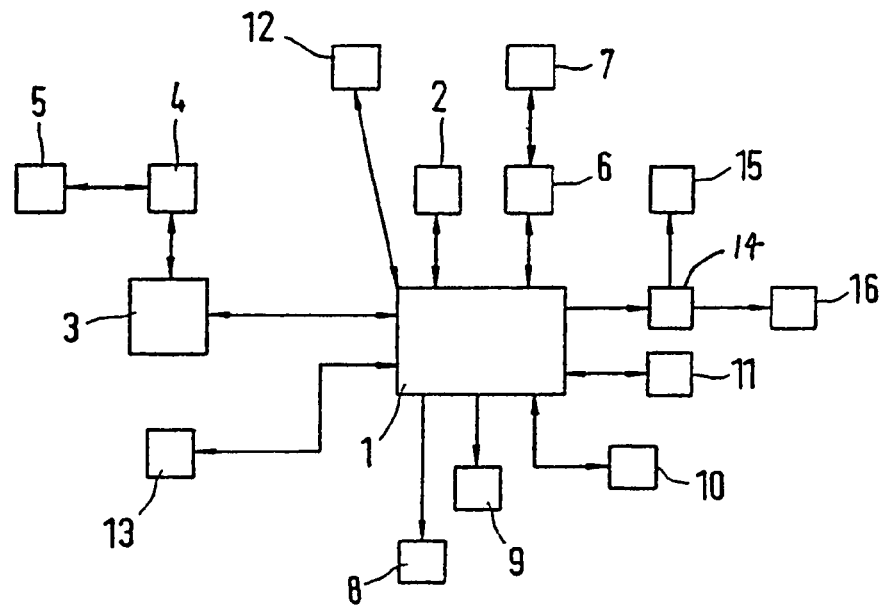
FIG. 1 shows an assistance device according to the present invention which is connected to various components.

FIG. 1 shows an assistance device according to the present invention in the form of a block diagram. A computer 1 of the assistance device may control components belonging to and connected to the assistance device. Computer 1 may be connected to a memory 2 over a first data input/output. Memory 2 may contain the user profiles and other temporarily stored data.

Computer 1 may be connected to a processor 3 over a second data input/output. Processor 3 may be connected to a signal processing unit 4 via a second data input/output. Signal processing unit 4 may be connected to a camera 5 via its second data input/output. Processor 3, signal processing unit 4 and camera 5 may together form an image processing system.

Camera 5 may be positioned in the vehicle so that it records the face of the respective driver. Camera 5 may relay this recorded data to signal processing unit 4 which may digitize the data and may transmit it as a data stream to processor 3, which may perform source coding to reduce the data volume. As an alternative, it may also be possible to omit the source coding and thus the data reduction.

The data stream thus reduced may be transferred from processor 3 to computer 1, so that computer 1 may compare the data coming from processor 3 with the data stored in memory 2 to determine whether the respective person has already been stored as a driver and if so, which person it is. If a person is recognized, the respective user profile may be loaded from memory 2 by computer 1 to perform the settings of the components connected to computer 1. However, a new person may need to first log on.

A speech processor 6 may be connected via a third data input/output of computer 1. A microphone 7 having connected electronics may be connected via the second data input/output of speech processor 6. Speech processor 6 and microphone 7 may together form a speech recognition system.

Microphone 7 may convert acoustic waves into electric signals; the connected electronics may amplify these signals and digitize them so that microphone 7 may send a digital data stream to speech processor 6. Speech processor 6 may perform source coding of the digital speech signals to reduce the data. Speech processor 6 may be designed as a signal processor. Source coding and thus data reduction may be omitted as an alternative, so that then the full data volume is forwarded.

The data thus reduced may be transferred from speech processor 6 to computer 1. Computer 1 may compare the data coming from speech processor 6 with speech patterns of authorized drivers of the vehicle stored in memory 2 and may check whether the speech pattern is present in memory 2, and if it is, to which person it belongs. Once the respective person has been identified, a corresponding user profile may be loaded out of memory 2 to allow the settings to be performed.

The use of two person recognition systems, e.g. the image processing system and the speech recognition system, may facilitate better identification of the respective person, which may be difficult in particular in the case of close relatives because they may be similar in appearance and in speech patterns. If both the image analysis and the speech analysis indicate the same person, the corresponding user profile may be loaded. As an alternative, it may also be possible to use only one of these person recognition systems. If the person recognized by the image processing system and the speech recognition system do not match, the person may be instructed to perform the identification routine again acoustically and/or optically.

New people may need to log on to the system, i.e. the assistance device, in some other way. This may need to be done by having these persons acquire access to the vehicle by using a key and then identify themselves as authorized persons to the assistance device, the face and/or voice pattern of the respective person being recorded and a user profile for this person being created. In addition to a key to open a lock on the vehicle, a chip card (key card) or an access code may also be possible means of gaining access to the vehicle so that the person may log on as described above.

Computer 1 may be connected to an air conditioning system 8 via a first data output. This air conditioning system 8 may be adjusted according to the user profile loaded into the memory. If no user profile has been loaded, e.g., because it is a person that has not yet been identified, preselected default settings may be used.

Computer 1 may be connected to a control system of person-dependent variable components of the vehicle via a second data output. These components may include, for example, the seat and headrest settings, but may also include the steering wheel setting and the rearview mirror. These settings may be made according to the user profile loaded in the memory; otherwise the last settings may be retained.

Computer 1 may be connected to a data server 10 via a fourth data input/output. Data server 10 may have a very large nonvolatile memory out of which computer 1 may load large volumes of data. Data server 10 may have data for operating instructions, a user's guide and a help function. Computer 1 may load this data on request, which may be recognized by microphone 7 and speech processor 6 and then may be loaded by computer 1 out of data server 10 according to this command.

Computer 1 may be connected to a receiving station 11 via a fifth data input/output. This receiving station 11 may be a radio receiver in particular. According to the user profile loaded out of memory 2, computer 1 may send corresponding adjustment specifications to receiving station 11, so that certain broadcasting stations may be set in the case of the radio receiver.

Receiving station 11 as a wireless receiver may also be used for receiving digital radio programs such as those possible with DAB (Digital Audio Broadcasting) or DRM (Digital Radio Mondial) or DVB (Digital Video Broadcasting), as well as a wireless receiver for analog wireless signals. Transmission of multimedia data in addition to audio programs may be possible using these digital wireless programs. According to this multimedia data, a setting may also be transferred from the user profile. If there is no user profile or if no information is available pertaining to the settings for receiving station 11, then the default settings may be used and stored as such in the user profile.

Computer 1 may be connected to a navigation device 12 via a sixth data input/output. According to the loaded user profile, navigation device 12 may be activated, so that the instantaneous location of the vehicle may be displayed. A target destination may be input by the driver. However, the user profile may also contain the information that navigation device 12 is not used.

Computer 1 may be connected to a sending/receiving station 13 via a seventh data input and output. Sending/receiving station 13 here may be a mobile telephone, but other sending/receiving stations which communicate by wireless means may also be possible here. For example, frequently used call numbers for the mobile telephone may also be contained in the loaded user profile, and data may also be called up with the mobile telephone so that the user profile may contain the information that a certain remote station is to be dialed to call up certain data immediately. This may include Internet sites containing the latest news, a weather report or stock quotes in particular.

Computer 1 may be connected to a signal processing unit 14 via a third data output. A loudspeaker 15 may be connected via a first data output of signal processing unit 14. A visual display 16 may be connected via a second data output of signal processing unit 14.

According to the loaded user profile, either both acoustic and visual forms of display may be selected or only one form may be selected. In addition, the display may also be limited to certain information. For example, visual display 16 may indicate only certain elements, e.g., the tachometer, the tank filling level, and the cooling water temperature when it is used as a projector aimed at the windshield, which may be called a head-up display. Signal processing unit 14 may convert information to be displayed into a form suitable for loudspeaker 15 and/or display 16. An electronic component connected to loudspeaker 15 may convert signals from signal processing unit 14 to analog signals and amplify them. An electronic component connected to display 16 may perform the corresponding steps.

Visual display 16 may also be designed as a retinal projector, where an electronically modulated beam of light may be projected through the pupil onto the retina, stimulating the light receptors in the retina so that an image may be generated on the retina. An image source may deliver the data to be represented to a light source which may be modulated according to the image data. This light source may have three different colors, red, green and blue, so that the information may be displayed in the correct colors through an appropriate mixture of the light of these three light sources. The power level used for the light may be so low that it does not damage the retina.

The modulated light may be rasterized by a scanner over the retina. This may need to take place rapidly so that the entire retina may be activated, as may also occur in normal vision. A lens system may be connected to the scanner, projecting the modulated beam of light onto the eye. This retinal projector may be mounted in the dashboard so that the driver may have the information projected into his eyes in accordance with the direction in which he is looking.

As an alternative, visual display 16 may also be designed as a display screen. Autostereoscopic display screens in particular may use two images of an object to represent it. These images may be displayed in such a way that the eyes of an observer see these recordings separately. This may be achieved first by giving the observer appropriate glasses having different filters so that the two eyes may see different things. In addition, the position of the driver's head may be analyzed by an image signal processing unit so that then the two different images may be allocated to the eyes automatically.

Figure 2:
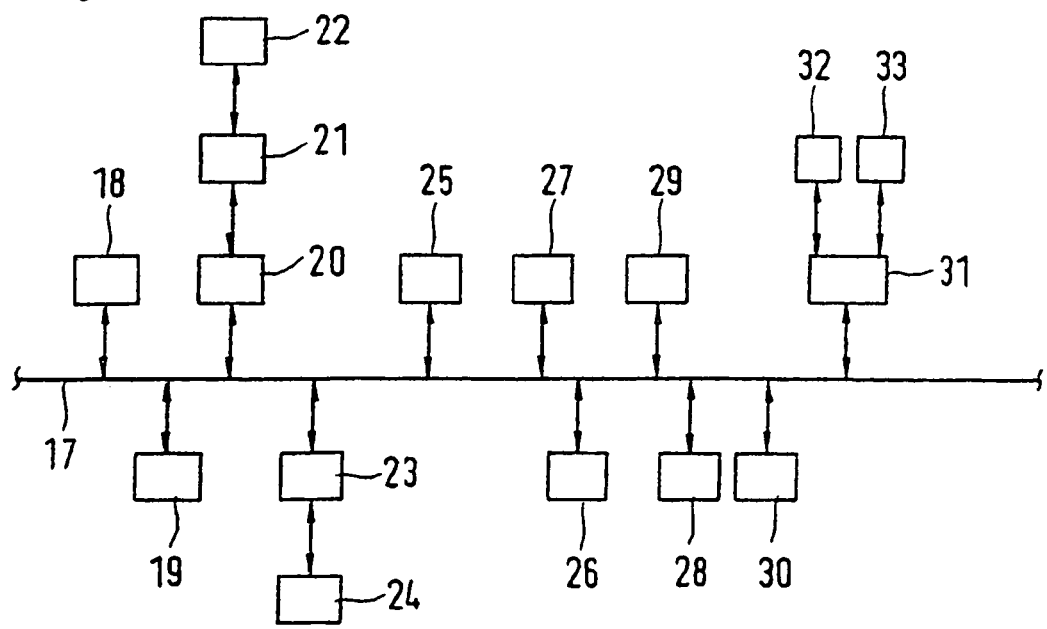
FIG. 2 shows an assistance device according to the present invention which is connected to various components by a bus.

FIG. 2 shows an assistance device according to the present invention, in which the various components are connected over a bus 17. All the components connected to bus 17 may have a module which controls communication over the bus. Such a module may be a suitable processor such as a microcontroller.

A computer 18 may be connected to bus 17 via a data input/output. A memory 19 may be connected to bus 17 via its data input/output. A processor 20 may be connected to bus 17 via a data input/output. Processor 20 may be connected to a signal processing unit 21 via a second data input/output. Signal processing unit 21 may be connected to a camera 22 via its second data input/output. A speech processor 23 may be connected to bus 17 via a data input/output. Speech processor 23 may be connected to a microphone 24 via a second data input/output. An air conditioning system 25, a control system for person-specific variable components of vehicle 26 and a data server 27 may each be connected to bus 17 via their data inputs/outputs. A receiving station 28, a navigation device 29 and a sending/receiving station 30 may each be connected to bus 17 via their data inputs/outputs. A signal processing unit 31 may be connected to bus 17 via a data input/output. Signal processing unit 31 may be connected to a loudspeaker 32 via a second data input/output. Signal processing unit 31 may be connected to an visual display 33 via a third data input/output.

The mode of operation here may be the same as that described in conjunction with FIG. 1.

The assistance device according to the present invention may offer the possibility for even a new person who would like to create his own user profile to be capable of logging on to the assistance device so that a data record may be created for this person as described above.

Once a user profile has been created, it may initially contain only the default settings which may be overwritten by input by the user. It may be possible to provide for these entries by the user to be accepted into the user profile only after confirmation by the user.

Additional components or also fewer components may be connected to the computer to be controlled according to a user profile.

What is claimed is:

1. An assistance device in a vehicle, comprising:
   a computer;
   an arrangement for recognition of persons and being connected to the computer;
   a data source connected to the computer;
   an arrangement for representation and being connected to the computer; and
   an arrangement for performing a data reception and being connected to the computer, wherein:
      the computer, as a function of a person recognized by the arrangement for recognition of persons, loads a user profile valid for a person recognized from a memory, in order to load data from the data source corresponding to the user profile, and to set the arrangement for performing the data reception and the arrangement for representation;
      the arrangement for data reception is configured to receive a broadband digital wireless signal including a signal for digital radio stations, multimedia data being received via the digital radio stations, and a setting being transferred from the user profile in accordance with the multimedia data;

the data sources includes a navigation device; and the arrangement for representation includes a display, the user profile determining which multimedia data are received, which settings are made on the navigation device, and which information is displayed on the display.

2. The assistance device according to claim 1, wherein the arrangement for recognition of persons includes at least one of:

a camera, a signal processing unit, and a processor to perform video identification of a person; and a microphone and a speech processor to perform a voice pattern recognition.

3. The assistance device according to claim 2, wherein the arrangement for data reception includes at least one of:

a receiving station; and a sending/receiving station.

4. The assistance device according to claim 3, wherein the data source includes at least one of:

the memory;

a data server; and a navigation device.

5. The assistance device according to claim 4, wherein the arrangement for representation includes a loudspeaker and a display.

6. The assistance device according to claim 5, wherein the display includes a projector for a windshield of the vehicle.

7. The assistance device according to claim 5, wherein the display includes a display screen.

8. The assistance device according to claim 5, wherein the display includes a projector which images information directly onto a retina of a driver.

9. The assistance device according to claim 5, wherein the display includes a combination of a projector for a windshield of the vehicle, a display screen, and a projector which images information directly onto a retina of a driver.

10. The assistance device according to claim 1, wherein the computer is connected by a bus to at least one other component of the device and to at least one component which is connected to the device.

11. The assistance device according to claim 1, wherein the computer alters the user profile according to at least one new setting of a specific person.

* * * * *